US005771366A

United States Patent [19]

Bjorksten et al.

[11] Patent Number: 5,771,366
[45] Date of Patent: Jun. 23, 1998

[54] METHOD AND SYSTEM FOR INTERCHANGING OPERANDS DURING COMPLEX INSTRUCTION EXECUTION IN A DATA PROCESSING SYSTEM

[75] Inventors: Andrew Augustus Bjorksten; Duc Quang Bui, both of Austin; Richard Edmund Fry, Round Rock; James Edward Phillips, Austin, all of Tex.

[73] Assignee: International Business Machines Corporation, Armonk, N.Y.

[21] Appl. No.: 489,181

[22] Filed: Jun. 9, 1995

[51] Int. Cl.[6] .................................................. G06F 9/00
[52] U.S. Cl. .......................................... 395/393; 711/211
[58] Field of Search .................................. 395/375, 393, 395/426.01

[56] References Cited

U.S. PATENT DOCUMENTS

| | | | |
|---|---|---|---|
| 3,234,367 | 2/1966 | Blaauw et al. | 235/156 |
| 3,344,261 | 9/1967 | Hornung | 235/160 |
| 3,863,224 | 1/1975 | Alexander | 364/761 |
| 4,413,326 | 11/1983 | Wilson et al. | 364/748.1 |
| 4,754,422 | 6/1988 | Sakai et al. | 364/761 |
| 4,823,260 | 4/1989 | Imel et al. | 395/563 |
| 4,823,301 | 4/1989 | Knierim | 364/761 |
| 4,996,660 | 2/1991 | Beacom et al. | 364/748.1 |
| 5,249,149 | 9/1993 | Cocanougher et al. | 364/748.1 |
| 5,258,944 | 11/1993 | Smith | 364/748.1 |
| 5,309,383 | 5/1994 | Kuroiwa | 364/748.1 |
| 5,325,494 | 6/1994 | Imai et al. | 395/393 |
| 5,367,650 | 11/1994 | Sharangpani et al. | 711/421.11 |
| 5,522,051 | 5/1996 | Sharangpani | 395/378 |
| 5,548,776 | 8/1996 | Colwell et al. | 395/393 |

*Primary Examiner*—William M. Treat
*Assistant Examiner*—Kenneth R. Coulter
*Attorney, Agent, or Firm*—Anthony V. S. England; Andrew J. Dillon

[57] ABSTRACT

A method and system for interchanging operands and loading such operands into a plurality of operand registers in an execution unit with the data processing system during execution of a complex instruction. A plurality of operands are stored within a register file, including a first operand and a second operand. An instruction is loaded into the first stage of the execution pipe within the execution unit, wherein the instruction has a plurality of fields. Such fields include a first and second field, containing a first and second operand pointer, respectively, for designating a value stored in the register file for loading into first and second operand registers, respectively. Next, the first and second operand pointers are interchanged between the first and second fields. Finally, the first operand register is loaded with the value in the register file designated by the second operand pointer stored in the first field, and the second operand register is loaded with the value in the register file designated by the first operand pointer in the second field, wherein the values in the register file designated by operand pointers in the fields of the instruction are loaded into different operand registers than originally specified by the instruction, thereby facilitating execution of a complex instruction in the execution unit.

20 Claims, 4 Drawing Sheets

METHOD AND SYSTEM FOR INTERCHANGING OPERANDS DURING COMPLEX INSTRUCTION EXECUTION IN A DATA PROCESSING SYSTEM

BACKGROUND OF THE INVENTION

1. Technical Field

The present invention relates in general to an improved data processing system, and in particular to a method and system for controlling the flow of operands into operand latches in an execution unit within the data processing system. Still more particularly, the present invention relates to a method and system for interchanging operands as such operands are loaded into operand latches in an execution unit within a data processing system.

2. Description of the Related Art

Data processing systems, and more specifically central processing units (CPUs), may be divided into two categories: complex instruction set computers (CISC) and reduced instruction set computers (RISC). In a CISC, numerous and complex instructions are typically implemented in a "microengine." Such a microengine included a microinstruction set to run microprograms or microcode written in such microinstructions to interpret the complex instructions.

In contrast, a RISC has a very simple data flow and instruction set. The goal in RISC is to implement the data processor without the need for microcode. However, it may be beneficial to implement selected instructions in a RISC utilizing a state machine, microcode, or the like. These selected instructions-which are referred to as "complex instructions"-are usually too complicated to implement in combinatorial logic, the way the other "atomic instructions" are implemented. One example of such a complex instruction is a floating point divide instruction. Another example is an instruction that calculates a square root.

In some implementations of a RISC, the floating point divide operation is synthesized, or emulated, by a state machine that performs simpler, atomic instructions according to a specified algorithm.

Consider the following floating point divide operation as an example:

$$\frac{a}{b} = Q$$

It is efficient in some data processing systems to change this floating point divide operation into the floating point multiply which is shown below:

$$b'XQ'=a'$$

The state machine then controls an algorithm that:
(1) Utilizes a table to look up an initial guess of "Q";
(2) Multiplies guess "Q" by divisor "b" and compares result "a" with dividend "a" to generate a "deviation" which is then used to correct guess "Q" until the "deviation" falls within a pre-defined limit. The "deviation" is calculated by the formula:

$$a'-a=\text{deviation}$$

While other algorithms are possible, all utilize a sequence of "atomic" instructions to converge upon the desired result. Such atomic instructions are performed in the execution unit without the use of a state machine, or microcode, or the like, which may be used to control a sequence of simpler instructions. Atomic instructions are typically performed in pipelined combinatorial logic, which may be referred to as an execution pipe.

To perform algorithms that synthesize complex instructions in a given data processing system architecture, the ability to interchange or swap operands between operand registers is often required before such operands are directed to the execution pipe. For example, in an architecture where a divide instruction is specified in code as:

DIV FRT, FRA, FRB which is an assembly language instruction that implements the operation:

$$(FRT) = \frac{(FRA)}{(FRB)}$$

where FRA is a field in the instruction word that stores an operand pointer that designates the register containing the dividend operand, FRB is a field in the instruction word that stores an operand pointer designating the divisor operand, and FRT is a field in the instruction word that stores an operand pointer that designates the register in which the result will be stored.

The divide algorithm discussed above substitutes a multiplication operation as part of the algorithm. Such a multiplication operation may be implemented in the data processing system architecture as:

MUL FRT, FRA, FRC which is an assembly language instruction that implements the operation:

$$(FRT)=(FRA)\times(FRC)$$

In using this multiply operation to implement the divide algorithm above, initial guess "Q" may be pointed to by a number in either the FRA field or FRC field, but the FRB field-which contains a number that points to divisor "b"-must be interchanged with the remaining multiplicand operand so that the correct operands are loaded into the operand registers that provide data for the execution pipe. That is, the operand designated, or pointed to, by the pointer in the FRB field must be used to load the b-operand into either the a- or c-operand register to perform the multiplication operation.

In the prior art, this interchange of operands was accomplished by multiplexing the operands before the operands were latched into operand latches, as shown in FIG. 1.

With reference now to FIG. 1, execution unit 10 is a high-level block diagram of a floating point execution unit in a superscalar data processing system, such as the superscalar microprocessor sold under the trademark "PowerPC" by IBM Microelectronics and Motorola Semiconductor. The "PowerPC" architecture is described in more detail in various user's manuals, including "PowerPC 603-RISC Microprocessor User's Manual," Copyright 1994, IBM Part No. MPR603UMU-01.

Floating point execution unit 10 receives instructions into instruction queue 12. Instructions received by floating point execution unit 10 are executed from the bottom of instruction unit 12. As illustrated, instruction 14 is shown in the bottom position in instruction queue 12.

In this example, instruction 14 contains a plurality of fields, which include: opcode field 16, target register pointer field 18, a-operand register pointer field 20, b-operand register pointer field 22, c-operand register pointer field 24, target rename buffer pointer field 26, a-operand rename buffer pointer field 28, b-operand rename buffer pointer field 30, c-operand rename buffer pointer field 32, a-operand completion bit 34, b-operand completion bit 36, and c-operand completion bit 38.

Opcode field 16 contains data that specifies the particular instruction to be executed within floating point execution unit 10. Fields 18–24 and fields 26–32 each contain data, or pointers, that point to, or designate, a register in register file 40. Register file 40 includes floating point unit rename buffer 42 and floating point registers 44. Each register in register file 40 is capable of storing a data word, which, for example, may include sixty-five bits of data.

Fields 18–24 are utilized to store pointers that designate a particular register in floating point registers 44. Similarly, fields 26–32 are utilized to store pointers that designate a register in floating point unit rename buffer 42. Completion bits 34–38 are utilized to select a corresponding pointer from fields 20–24 or 28–32, depending upon the status of preceding instructions which provide the operands for instruction 14. For example, as an instruction that calculates or loads the a-operand is "finished," the a-operand may be stored in a register in floating point unit rename buffer 42. As that same instruction "completes," the a-operand may be moved to floating point registers 44, which are the architected registers used by floating point execution unit 10. Floating point unit rename buffer 42 contains registers that are used when instructions that are executed out-of-order "finish" before subsequent instructions have been "completed" in program order.

Thus, a-operand register pointer field 20, b-operand register pointer field 22, and c-operand register pointer field 24 each contain a pointer that points to a register in floating point registers 44. These pointers are utilized to specify the respective operands used to execute the instruction specified by opcode field 16. Likewise, a-operand rename buffer pointer field 28, b-operand rename buffer pointer field 30, and c-operand rename buffer pointer field 32 each contain a pointer that designates a register in floating point unit rename buffer 42.

The data in opcode field 16 is immediately loaded into instruction register 46 if the instruction is an "atomic" instruction. If the instruction in opcode field 16 is a "complex" instruction, algorithmic state machine 48 takes control and places a sequence of atomic instructions into instruction register 46. The pointer in target rename buffer pointer field 26 is also loaded into instruction register 46 to designate a register address for storing the result of instruction 14. Instruction register 46 may also be referred to as the first stage of the execution pipe because instruction register 46 receives opcodes which initiate instruction execution in the execution pipe.

Arithmetic controls 50 controls mantissa execution pipe 52 and exponent execution pipe 54 according to the instruction loaded into instruction register 46. After execution, the result of the instruction in instruction register 46 is loaded into a register in register file 40, or stored in temporary register 56, or loaded directly back into multiplexers 58–62. If the result of the instruction in instruction register 46 is needed immediately, the result is forwarded into multiplexers 58–62. If the result is not needed immediately, temporary register 56 may be utilized to temporarily store the result. The final answer of the instruction may be stored in register file 40, in either floating point unit rename buffer 42, or, under the control of completion logic 64, into floating point registers 44. Arithmetic controls 50 supplies a write address and write enable signal to floating point unit rename buffer 42, and completion logic 64 provides a write address and write enable signal to floating point registers 44.

If, for example, an operand designated by the pointer in a-operand register pointer field 20 must be loaded into the b-operand latch 66, the operand values are swapped, or interchanged, or multiplexed, with multiplexer 60, which selects the b-operand to be loaded into the b-operand latch 66 in accordance with multiplexer control signals from algorithmic state machine 48. Similarly, the a- and c-operands are selected by multiplexers 58 and 62, respectively, under the control of signals from algorithmic state machine 48.

Thus, in the prior art, three multiplexers are required to interchange, or control the data flow of, the a-, b-, and c-operands, as those operands are loaded into operand latches 66. Each of these multiplexers 58–62 has five inputs, wherein each input is sixty-five bits wide. This means that 975 input lines are required to multiplex operands into the proper operand latches as shown in FIG. 1.

As should be apparent to one of ordinary skill in the art, the disadvantages of the prior art include: a large number of lines into multiplexers for exchanging operands requires considerable die space within the semiconductor device, and the location in the data flow of such multiplexers introduces a delay between register file 40 and operand latches 66. Power dissipation also becomes a problem in the prior art because the capacitance of all multiplexer input lines must be charged and discharged. Power dissipation and die space also becomes a problem because larger, more powerful transistors are necessary to drive all data lines connected to multiple inputs of multiple multiplexers.

SUMMARY OF THE INVENTION

It is therefore one object of the present invention to provide an improved data processing system.

It is another object of the present invention to provide a method and system for controlling the flow of operands into operand latches in an execution unit within the data processing system.

It is yet another object of the present invention to provide a method and system for interchanging operands as such operands are loaded into operand latches in an execution unit within a data processing system.

The foregoing objects are achieved as is now described. A method and system are disclosed in a data processing system for interchanging operands and loading such operands into a plurality of operand registers in an execution unit with the data processing system during execution of a complex instruction. A plurality of operands are stored within a register file, including a first operand and a second operand. An instruction is loaded into an instruction queue within the execution unit, wherein the instruction has a plurality of fields. Such fields include a first and second field, containing a first and second operand pointer, respectively, for designating a value stored in the register file for loading into first and second operand registers, respectively. Next, the first and second operand pointers are interchanged between the first and second fields. Finally, the first operand register is loaded with the value in the register file designated by the second operand pointer stored in the first field, and the second operand register is loaded with the value in the register file designated by the first operand pointer in the second field, wherein the values in the register file designated by operand pointers in the fields of the instruction are loaded into different operand registers than originally specified by the instruction, thereby facilitating execution of a complex instruction in the execution unit.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
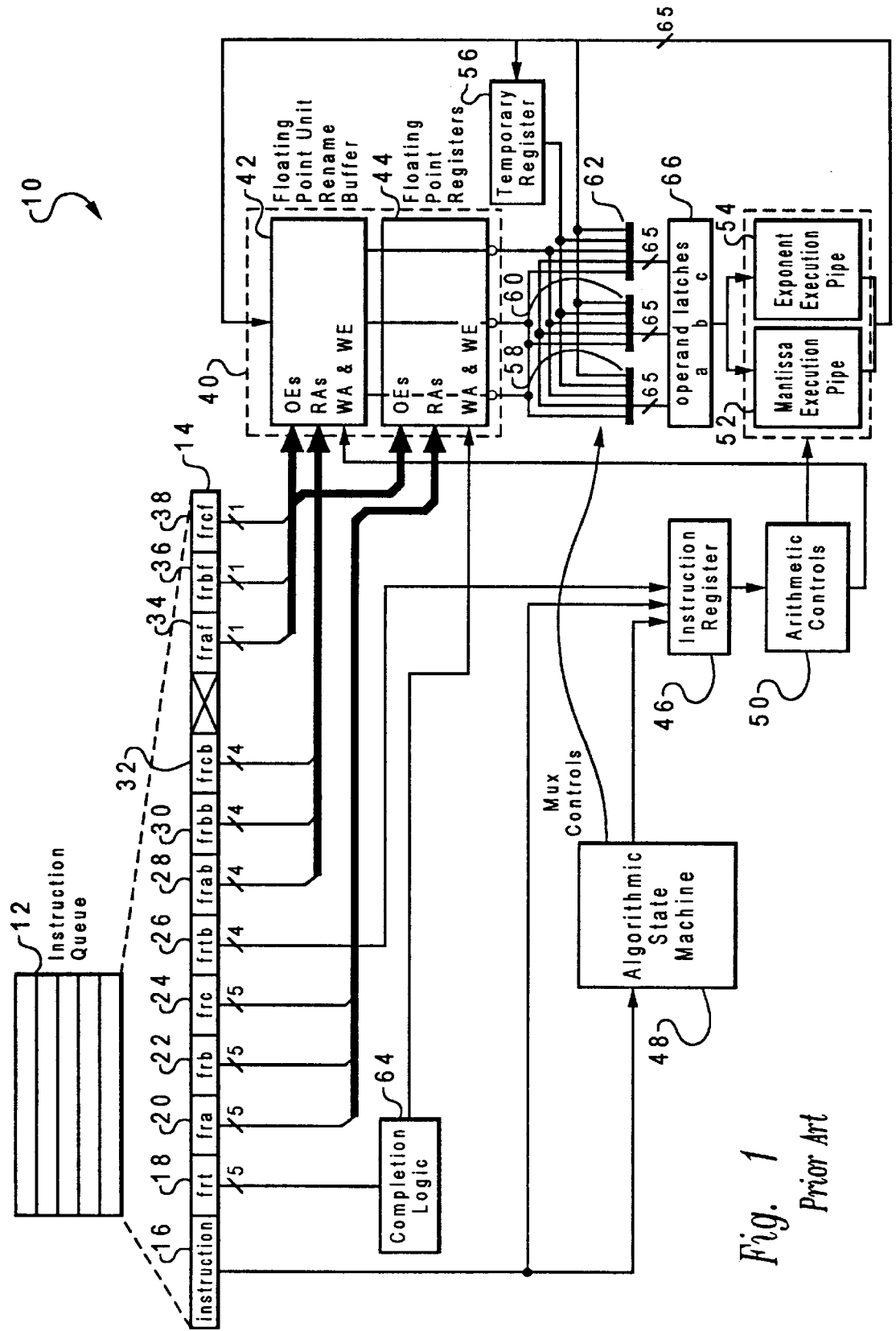
FIG. 1 is a high-level block diagram of a floating point execution unit in a superscalar data processing system.
Figure 2:
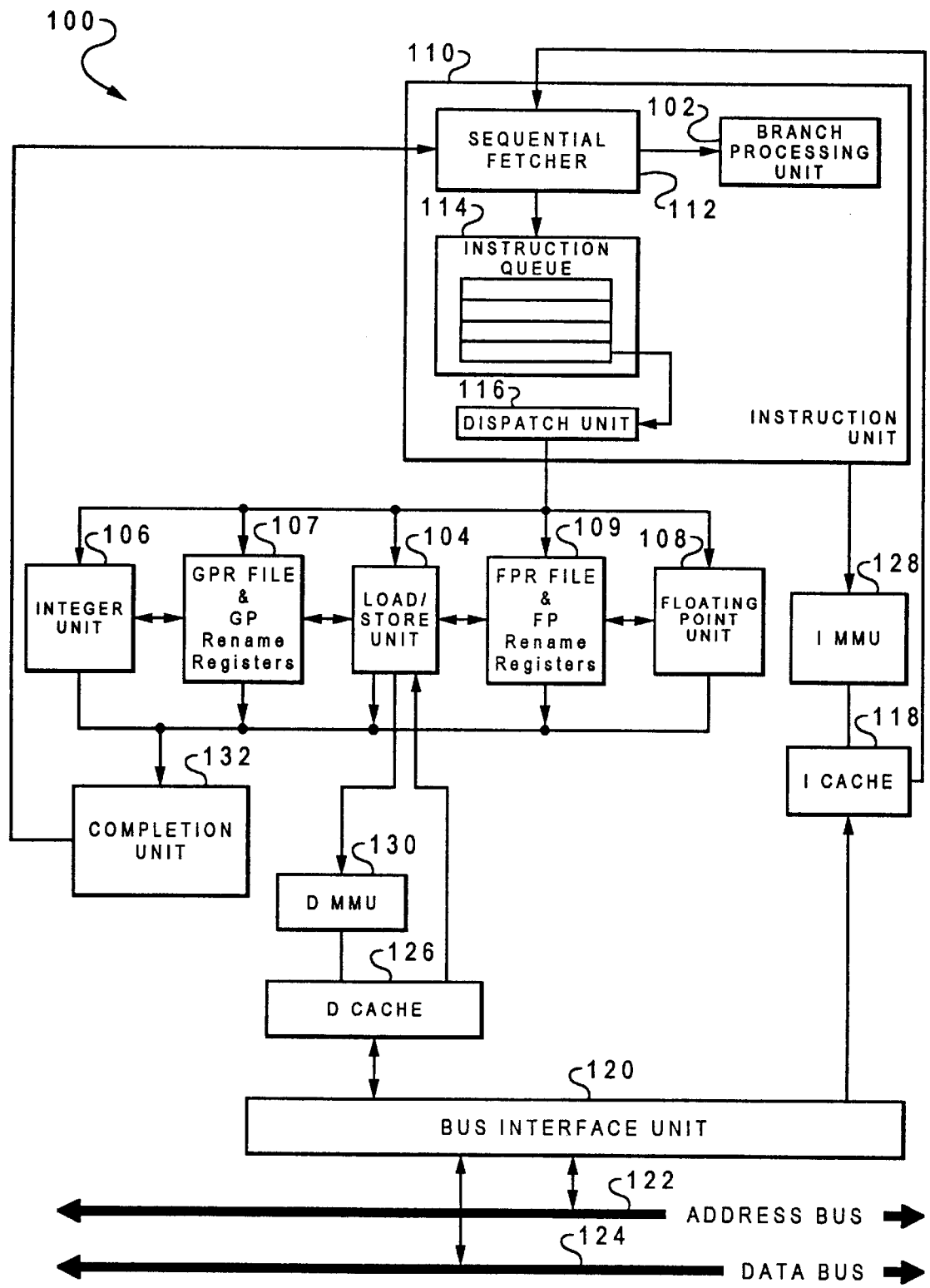
FIG. 2 depicts a superscalar data processing system in accordance with the method and system of the present invention.

With reference now to the figures, and in particular with reference to FIG. 2, there is depicted a superscalar data processing system in accordance with the method and system of the present invention. A superscalar processor is one that issues multiple independent instructions into multiple pipelines allowing multiple instructions to execute in parallel. As illustrated in FIG. 2, superscalar data processing system 100 includes five independent execution units and two register files. The five independent execution units include: branch processing unit (BPU) 102, load/store unit 104, integer unit 106, and floating-point unit 108. Register files include: general purpose register file (GPR) 107 for integer operands, and floating-point register file (FPR) 109 for single- or double-precision floating-point operands. Furthermore, both GPR 107 and FPR 109 may include a set of rename registers. For example, FPR 109 includes both floating-point registers, such as floating-point registers 44 in FIG. 1, and a rename buffer containing registers, such as floating point unit rename buffer 42 of FIG. 1.

Instruction unit 110 contains sequential fetcher 112, instruction queue 114, dispatch unit 116, and branch processing unit 102. Instruction unit 110 determines the address of the next instruction to be fetched based upon information received from sequential fetcher 112 and branch processing unit 102.

Sequential fetcher 112 fetches instructions from instruction cache 118 and loads such instructions into instruction queue 114. Branch instructions are identified by sequential fetcher 112, and forwarded to branch processing unit 102 directly, bypassing instruction queue 114. Such a branch instruction is either executed and resolved (if the branch is unconditional or if required conditions are available), or is predicted. Non-branch instructions are issued from instruction queue 114, with the dispatch rate being contingent on execution unit busy status, rename and completion buffer availability, and the serializing behavior of some instructions. Instruction dispatch is done in program order. BPU 102 uses static branch prediction on unresolved conditional branches to allow instruction unit 110 to fetch instructions from a predicted target instruction stream while a conditional branch is evaluated. Branch processing unit 102 folds out branch instructions for unconditional branches or conditional branches unaffected by instructions in progress in the execution pipeline.

Instruction queue 114 holds several instructions loaded by sequential fetcher 112. Sequential fetcher 112 continuously loads instructions to keep the space in instruction queue 114 filled. Instructions are dispatched to their respective execution units from dispatch unit 116. In operation, instructions are fetched from instruction cache 118 and placed in either instruction queue 114 or branch processing unit 102. Instructions entering instruction queue 114 are issued to the various execution units from instruction queue 114. Instruction queue 114 is the backbone of the master pipeline for superscalar data processing system 100, and may contain, for example, a six-entry queue. If while filling instruction queue 114, a request from sequential fetcher 112 misses in instruction cache 118, then arbitration for a memory access will begin.

Data cache 126 provides cache memory for load/store unit 104. Instruction memory management unit 128 and data memory management unit 130 support accesses to virtual memory and physical memory for both instructions and data, respectively. The memory management units perform address translations and determine whether a cache hit or miss has occurred. Bus interface unit 120 controls access to the external address and data buses by participating in bus arbitration. The external address bus is shown at reference numeral 122, and the external data bus is shown at reference numeral 124.

Figure 3:
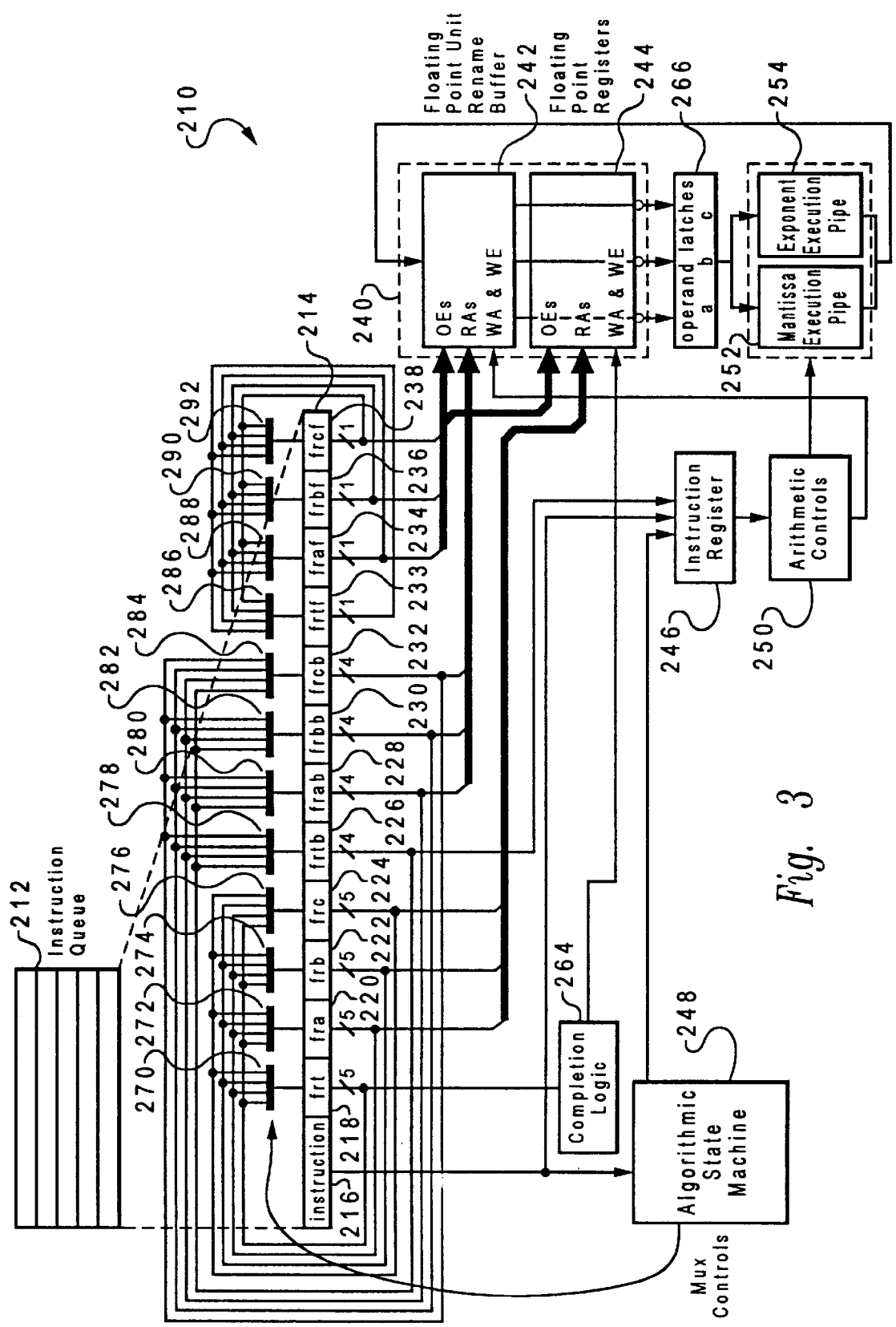
FIG. 3 illustrates a floating point execution unit in accordance with the method and system of the present invention.

With reference now to FIG. 3, there is depicted a floating point execution unit in accordance with the method and system of the present invention. As illustrated, floating point execution unit 210 includes instruction queue 212 for receiving instructions from dispatch unit 116, in FIG. 2. Instructions, such as instruction 214 are executed from the bottom of instruction queue 212.

Instruction 214 includes opcode field 216, target register pointer field 218, a-operand register pointer field 220, b-operand register pointer field 222, c-operand register pointer field 224, target rename buffer pointer field 226, a-operand rename buffer pointer field 228, b-operand rename buffer pointer field 230, c-operand rename buffer pointer field 232, target register completion bit 233, a-operand completion bit 234, b-operand completion bit 236, and c-operand completion bit 238. As described above with reference to FIG. 1, each of the fields listed above contains data needed for the execution of instruction 214. Opcode field 216 contains data that specifies the particular instruction to be executed by floating point execution unit 210. Fields 218-232 point to registers in register file 240. More particularly, fields 218-234 contain data that points to registers in floating point registers 244, and fields 226-232 contain pointers that point to registers in floating point unit rename buffer 242.

Completion bits 233-238 are used to indicate whether to read from floating point registers 244, or whether to read from and write to floating point unit rename buffer 242. Operands for a particular instruction are read from floating point registers 244 when the instruction that calculated or loaded a particular operand into a register has completed. If the instruction that calculates or loads an operand into a register has not completed, the operand may be read from floating point unit rename buffer 242. Thus, the reason for two sets of registers-floating-point registers 244 and floating-point unit rename buffer 242-is to facilitate out-of-order or speculative instruction execution, as is known in the prior art.

Instruction register 246 receives instructions from either opcode field 216 if an atomic instruction is to be executed, or algorithmic state machine 248 if a complex instruction is to be executed. Instruction register 246 may also be referred to as the first stage of the execution pipe because instruction register 246 receives opcodes which initiate instruction execution 11 in the execution pipe.

Arithmetic control 250 controls mantissa execution pipe 252 and exponent execution pipe 254 to produce the result directed by the instruction in instruction register 246. Such a result produced by executing the instruction is then loaded directly into operand latches 266 or register file 240, as required by the particular algorithm executed to perform the complexing instruction. Operand latches 266 includes an a-operand latch, a b-operand latch, and a c-operand latch. The operands stored in these operand latches are manipulated in the execution pipe under the control of arithmetic control 250. Completion logic 264 is utilized to provide a write address and a write enable signal to floating point registers 244.

According to an important aspect of the present invention, operands designated by pointers in fields of instruction 214 may be loaded into selected operand latches in operand latches 266 by multiplexing the pointers stored in fields 218–238 of instruction 214. Such multiplexing is accomplished with multiplexers 270–292. As illustrated, fields 218–224 are each input into multiplexers 270–276 so that under the control of signals from algorithmic state machine 248, any pointer in any field 218–224 may be swapped or interchanged with any other field 218–224.

Similarly, fields 226–232 are each input into multiplexers 278–284 so that under the control of signals from algorithmic state machine 248, any field 226–232 may be interchanged or swapped with any other field 226–232. In a similar manner, completion bits 233–238 are each input into multiplexers 286–292 such that any completion bit 233–238 may be interchanged or swapped with any other completion bit 233–238.

In operation, if algorithmic state machine 248 causes the execution of an atomic instruction that requires loading the operand specified in a-operand register pointer field 220 into b-operand latch 266, algorithmic state machine 248 sends multiplexer control signals to multiplexer 272 and 274 which causes the pointer in field 220 to be placed in field 222, and the pointer in field 222 to be placed in field 220. Then, as the read address supplied by the pointers is applied to floating-point registers 244 from bis operand register pointer field 222, b-operand latch 266 will be loaded with an operand that was formerly pointed to by the pointer stored in a-operand register pointer field 220. In a similar manner, the fields pointing to registers in floating-point unit rename buffer 242 may be swapped, thereby providing a similar result.

Typically, when pointers that point to floating point registers 244 are interchanged, the corresponding pointers that point to floating-point unit rename buffer 242 are also interchanged, and completion bits 233–238 are interchanged to correspond with the pointer interchange in fields 218–224 and fields 226–232.

According to another important aspect of the present invention, intermediate results calculated in the algorithm under the control of algorithmic state machine 248 are stored in the register pointed to by the pointer in target rename buffer pointer field 226, rather than in a temporary register 56, as shown in FIG. 1. The write address and write enable signals for storing such a temporary result are supplied by field 226, through instruction register 246 and arithmetic controls 250, to floating point unit rename buffer 242. Thus, when a temporary result is needed for an operand in a subsequent instruction in the algorithm, the pointer stored in field 226 may be interchanged according to the present invention with one of fields 228–232 to cause the temporary result to be loaded into the a-, b-, or c-operand latch 266.

Figure 4:
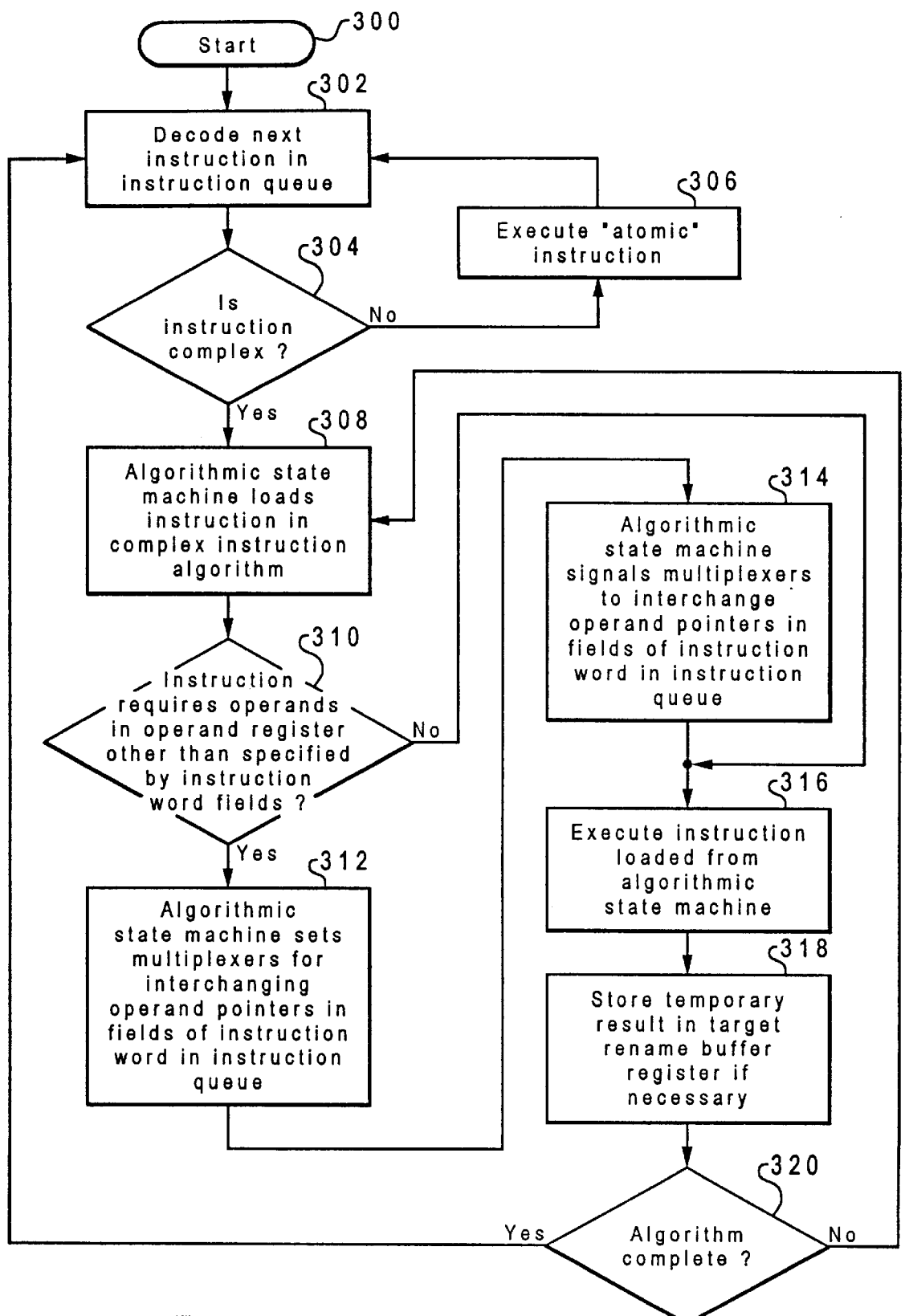
FIG. 4 depicts a high-level flowchart illustrating the process of interchanging operands during the execution of complex instructions in a data processing system in accordance with the method and system of the present invention.

With reference now to FIG. 4, there is depicted a high-level flowchart illustrating the process of interchanging operands during the execution of complex instructions in a data processing system in accordance with the method and system of the present invention. As illustrated, the process begins at block 300 and thereafter passes to block 302. Block 302 illustrates the process of decoding a next instruction in the instruction queue, such as instruction 214 in instruction queue 212 in FIG. 3. The instruction is decoded to determine what kind of instruction will be executed by the execution unit.

Next, the process determines whether or not the newly decoded instruction is a "complex" instruction, as depicted at block 304. If the decoded instruction is not a complex instruction, it will be an "atomic" instruction, and the process executes such atomic instructions as illustrated at block 306. After executing the atomic instruction, the process continues at block 302, where the next instruction is decoded.

If the newly decoded instruction is a complex instruction, algorithmic state machine 248 (see FIG. 3) loads the first instruction to perform the complex instruction algorithm into instruction register 246 (see FIG. 3), as depicted at block 308. The process then determines if the instruction requires operands in an operand register that is different from what is specified by the instruction word fields in the complex instruction currently being executed, as illustrated at block 310. If the pointers in the instruction fields are not set to correctly load operands into the proper operand registers, the algorithmic state machine sets the multiplexers coupled to the pointer fields in the instruction word so that they may interchange operand pointers in the fields of the instruction word in the instruction queue, as depicted at block 312. Next, the algorithmic state machine signals the multiplexers to interchange the operand pointers in the fields of the instruction word in the instruction queue, as illustrated at block 314.

After the operand pointers have been interchanged, and the correct operands are loaded into the proper operand latches, the process executes the instruction in instruction register 246 (see FIG. 3), which was loaded from algorithmic state machine 248, as depicted at block 316. With reference again to block 310, if the instruction does not require interchanging operands, the process proceeds from block 310 to block 316, where the instruction is executed.

After the instruction is executed, the process may store a temporary result in the target rename buffer register, if the algorithm requires storing a temporary result, as illustrated at block 318. Thereafter, the process determines whether or not the algorithm is complete, as depicted at block 320. If the algorithm is not complete, the algorithmic state machine loads the next instruction, as illustrated at block 308. If the algorithm is complete, the process returns to block 302, where the next instruction for execution by the execution unit is decoded.

While the present invention has been illustrated in the context of a floating-point execution unit within a superscalar data processor, those persons skilled in the art should recognize that the present invention may be applied in other context where operands specified by an instruction word must be exchanged before loading such operands into oper-and latches. Furthermore, whenever complex instructions are executed by implementing an algorithm in a RISC, the present invention may be utilized to temporarily store intermediate results calculated in such an algorithm in a target rename buffer register.

In the embodiment of the present invention disclosed above, twelve multiplexers are used to multiplex the contents of selected fields in an instruction word. Four of these multiplexers have four inputs having five bits each. Four other of these multiplexers have four inputs having four bits each. And the last four of these multiplexers have four inputs of one bit each. Therefore, the total number of multiplexer inputs is 160 lines. Those persons skilled in the art should appreciate that the present invention reduces the number of input lines to multiplexers from 975 to 160-a savings of 815 input lines. Additionally, temporarily saving intermediate results in a target rename buffer register eliminates the need for a temporary register, such as register 56 in FIG. 1, which saves additional space, and reduces complexity, in the data processing system.

Although the embodiment of the present invention described above swaps or interchanges two or more operand pointers, the method and system of the present invention may also be used to move a single operand pointer without interchanging pointers. For example, an instruction that loads a single operand into the a-operand latch may be changed by the algorithm state machine into another instruction that loads the operand in into the b-operand latch. In this case, the method and system of the present invention may be utilized to move the operand pointer from the a-operand register pointer field to the b-operand register pointer field.

The foregoing description of a preferred embodiment of the invention has been presented for the purpose of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A method in a data processing system for interchanging operands and loading said operands into a plurality of operand registers in an execution unit within said data processing system during execution of a complex instruction, wherein said execution unit includes an instruction queue, and wherein said execution unit executes atomic instructions and complex instructions having a plurality of operand pointers for pointing to said plurality of operands stored in a register file coupled to said operand registers, wherein said plurality of operands includes a first operand and a second operand, said method comprising the steps of:

loading an instruction into said instruction queue; determining whether said instruction is an atomic instruction or a complex instruction;

in response to determination that said instruction is a complex instruction, having a plurality of fields, wherein:
a first field contains a first operand pointer for designating a value stored in said register file for loading into a first operand register; and
a second field contains a second operand pointer for designating a value stored in said register file for loading into a second operand register;

interchanging said first operand pointer in said first field with said second operand pointer in said second field;

loading into said first operand register a value stored in said register file designated by said second operand pointer stored in said first field; and loading into said second operand register a value stored in said register file designated by said first operand pointer stored in said second field, wherein values in said register file designated by operand pointers in said fields of said instruction are loaded into different operand registers than originally specified by said instruction during execution of said complex instruction.

2. The method for interchanging operands and loading said operands into a plurality of operand registers according to claim 1 wherein said first field is coupled to an output of a first multiplexer and said second field is coupled to an output of a second multiplexer, and wherein an input to said first multiplexer is coupled to said second field and an input to said second multiplexer is coupled to said first field, and wherein said step of interchanging said first operand pointer in said first field with said second operand pointer in said second field includes moving said first operand pointer to said second field via said second multiplexer and moving said second operand pointer to said first field via said first multiplexer.

3. The method for interchanging operands and loading said operands into a plurality of operand registers according to claim 1 further including the steps of:

detecting the presence of a complex instruction in said instruction queue in said execution unit;

in response to detecting said complex instruction, executing an alternate instruction to produce an intermediate result;

temporarily storing said intermediate result in a rename buffer designated by a rename buffer pointer stored in a rename buffer pointer field in said instruction;

interchanging said first operand pointer in said first field with said rename buffer pointer in said rename buffer pointer field; and loading into said first operand register a value stored in said rename buffer designated by said rename buffer pointer stored in said first field.

4. The method for interchanging operands and loading said operands into a plurality of operand registers according to claim 3 wherein said first field is coupled to an output of a first multiplexer and said rename buffer pointer field is coupled to an output of a second multiplexer, and wherein an input to said first multiplexer is coupled to said rename buffer pointer field and an input to said second multiplexer is coupled to said first field, and wherein said step of interchanging said first operand pointer in said first field with said rename buffer pointer in said rename buffer pointer field includes moving said first operand pointer to said rename buffer pointer field via said second multiplexer and moving said rename buffer pointer to said first field via said first multiplexer.

5. The method for interchanging operands and loading said operands into a plurality of operand registers according to claim 4 wherein said execution unit includes an algorithmic state machine coupled to said first and second multiplexers for communicating control signals to control execution of an algorithm that synthesizes a complex instruction, and wherein said step of moving said first operand pointer to said second field via said second multiplexer and moving said second operand pointer to said first field via said first multiplexer includes:

setting said first multiplexer to output said rename buffer pointer in response to receiving said control signals;

setting said second multiplexer to output said first operand pointer in response to receiving said control signals; and moving said first operand pointer to said rename buffer pointer field via said second multiplexer and moving said rename buffer pointer to said first field via said first multiplexer, in response to said control signals from said algorithmic state machine.

6. The method for interchanging operands and loading said operands into a plurality of operand registers according to claim 2 wherein said execution unit includes an algorithmic state machine coupled to said first and second multiplexers for communicating control signals to control execution of an algorithm that synthesizes a complex instruction, and wherein said step of moving said first operand pointer to said second field via said second multiplexer and moving said second operand pointer to said first field via said first multiplexer includes:

setting said first multiplexer to output said second operand pointer in response to receiving said control signals;

setting said second multiplexer to output said first operand pointer in response to receiving said control signals; and moving said first operand pointer to said second field via said second multiplexer and moving said second operand pointer to said first field via said first multiplexer, in response to said control signals from said algorithmic state machine.

7. The method for interchanging operands and loading said operands into a plurality of operand registers according to claim 1 further including the steps of:

loading an instruction into said instruction queue, said instruction having said plurality of fields, wherein:

a third field contains a third operand pointer for designating a value stored in a rename buffer register file for loading into said first operand register; and a fourth field contains a fourth operand pointer for designating a value stored in said rename buffer register file for loading into said second operand register; and interchanging said third operand pointer in said third field with said fourth operand pointer in said fourth field in response to interchanging said first operand pointer in said first field with said second operand pointer in said second field.

8. The method for interchanging operands and loading said operands into a plurality of operand registers according to claim 7 further including the steps of:

loading an instruction into said instruction queue, said instruction having said plurality of fields, wherein:

a fifth field contains a first bit for selecting either said first operand pointer or said third operand pointer for designating one of two values for loading into said first operand register; and a sixth field contains a second bit for selecting either said second operand pointer or said fourth operand pointer for designating one of two values for loading into said second operand register; and interchanging said first bit in said fifth field with said second bit in said sixth field in response to interchanging said first operand pointer in said first field with said second operand pointer in said second field.

9. The method for interchanging operands and loading said operands into a plurality of operand registers according to claim 3 wherein said step of temporarily storing said intermediate result in a rename buffer designated by a rename buffer pointer stored in a rename buffer pointer field in said instruction includes temporarily storing said intermediate result in a rename buffer designated by a target rename buffer pointer stored in a target rename buffer pointer field in said instruction.

10. A data processing system for interchanging operands and loading said operands into a plurality of operand registers in an execution unit within said data processing system during execution of a complex instruction, wherein said execution unit includes an instruction queue, and wherein said execution unit executes atomic instructions and complex instructions having a plurality of operand pointers for pointing to said plurality of operands stored in a register file coupled to said operand registers, said data processing system comprising:

means for determining whether an instruction is an atomic instruction or a complex instruction, means for storing said plurality of operands within said register file in response to a determination that said instruction is a complex instruction, wherein said plurality of operands includes a first operand and a second operand;

means for loading said complex instruction into said instruction queue, said complex instruction having a plurality of fields, wherein:

a first field contains a first operand pointer for designating a value stored in said register file for loading into a first operand register; and a second field contains a second operand pointer for designating a value stored in said register file for loading into a second operand register;

means for interchanging said first operand pointer in said first field with said second operand pointer in said second field;

means for loading into said first operand register a value stored in said register file designated by said second operand pointer stored in said first field; and means for loading into said second operand register a value stored in said register file designated by said first operand pointer stored in said second field, wherein values in said register file designated by operand pointers in said fields of said complex instruction are loaded into different operand registers than originally specified by said complex instruction during execution of said complex instruction.

11. The data processing system for interchanging operands and loading said operands into a plurality of operand registers according to claim 10 wherein said first field is coupled to an output of a first multiplexer and said second field is coupled to an output of a second multiplexer, and wherein an input to said first multiplexer is coupled to said second field and an input to said second multiplexer is coupled to said first field, and wherein said means for interchanging said first operand pointer in said first field with said second operand pointer in said second field includes means for moving said first operand pointer to said second field via said second multiplexer and means for moving said second operand pointer to said first field via said first multiplexer.

12. The data processing system for interchanging operands and loading said operands into a plurality of operand registers according to claim 10 further including:
   means for detecting the presence of a complex instruction in said instruction queue in said execution unit;
   means for executing an alternate instruction to produce an intermediate result in response to detecting said complex instruction;
   means for temporarily storing said intermediate result in a rename buffer designated by a rename buffer pointer stored in a rename buffer pointer field in said instruction;
   means for interchanging said first operand pointer in said first field with said rename buffer pointer in said rename buffer pointer field; and
   means for loading into said first operand register a value stored in said rename buffer designated by said rename buffer pointer stored in said first field.

13. The data processing system for interchanging operands and loading said operands into a plurality of operand registers according to claim 12 wherein said first field is coupled to an output of a first multiplexer and said rename buffer pointer field is coupled to an output of a second multiplexer, and wherein an input to said first multiplexer is coupled to said rename buffer pointer field and an input to said second multiplexer is coupled to said first field, and wherein said means for interchanging said first operand pointer in said first field with said rename buffer pointer in said rename buffer pointer field includes means for moving said first operand pointer to said rename buffer pointer field via said second multiplexer and means for moving said rename buffer pointer to said first field via said first multiplexer.

14. The data processing system for interchanging operands and loading said operands into a plurality of operand registers according to claim 13 wherein said execution unit includes an algorithmic state machine coupled to said first and second multiplexers for communicating control signals to control execution of an algorithm that synthesizes a complex instruction, and wherein said means for moving said first operand pointer to said second field via said second multiplexer and means for moving said second operand pointer to said first field via said first multiplexer includes:
   means for setting said first multiplexer to output said rename buffer pointer in response to receiving said control signals;
   means for setting said second multiplexer to output said first operand pointer in response to receiving said control signals; and
   means for moving said first operand pointer to said rename buffer pointer field via said second multiplexer and moving said rename buffer pointer to said first field via said first multiplexer, in response to said control signals from said algorithmic state machine.

15. The data processing system for interchanging operands and loading said operands into a plurality of operand registers according to claim 11 wherein said execution unit includes an algorithmic state machine coupled to said first and second multiplexers for communicating control signals to control execution of an algorithm that synthesizes a complex instruction, and wherein said means for moving said first operand pointer to said second field via said second multiplexer and means for moving said second operand pointer to said first field via said first multiplexer includes:
   means for setting said first multiplexer to output said second operand pointer in response to receiving said control signals;
   means for setting said second multiplexer to output said first operand pointer in response to receiving said control signals; and
   means for moving said first operand pointer to said second field via said second multiplexer and means for moving said second operand pointer to said first field via said first multiplexer in response to said control signals from said algorithmic state machine.

16. The data processing system for interchanging operands and loading said operands into a plurality of operand registers according to claim 10 further including:
   means for loading an instruction into said instruction queue, said instruction having said plurality of fields, wherein:
      a third field contains a third operand pointer for designating a value stored in a rename buffer register file for loading into said first operand register; and
      a fourth field contains a fourth operand pointer for designating a value stored in said rename buffer register file for loading into said second operand register; and
   means for interchanging said third operand pointer in said third field with said fourth operand pointer in said fourth field in response to interchanging said first operand pointer in said first field with said second operand pointer in said second field.

17. The data processing system for interchanging operands and loading said operands into a plurality of operand registers according to claim 16 further including:
   means for loading an instruction into said instruction queue, said instruction having said plurality of fields, wherein:
      a fifth field contains a first bit for selecting either said first operand pointer or said third operand pointer for designating one of two values for loading into said first operand register; and
      a sixth field contains a second bit for selecting either said second operand pointer or said fourth operand pointer for designating one of two values for loading into said second operand register; and
   means for interchanging said first bit in said fifth field with said second bit in said sixth field in response to interchanging said first operand pointer in said first field with said second operand pointer in said second field.

18. The data processing system for interchanging operands and loading said operands into a plurality of operand registers according to claim 12 wherein said means for temporarily storing said intermediate result in a rename buffer designated by a rename buffer pointer stored in a rename buffer pointer field in said instruction includes means for temporarily storing said intermediate result in a rename buffer designated by a target rename buffer pointer stored in a target rename buffer pointer field in said instruction.

19. A method in a data processing system for loading an operand into one of a plurality of operand registers in an execution unit within said data processing system during execution of a complex instruction, wherein said execution unit includes an instruction queue, and wherein said execution unit executes instructions having an operand pointer for pointing to an operand stored in a register file coupled to said plurality of operand registers, said method comprising the steps of:

loading an instruction into said instruction queue, said instruction having a plurality of pointer fields, wherein:
        a first pointer field contains an operand pointer for designating an operand stored in said register file for loading into a first operand register; and
        a second pointer field designates an operand stored in said register file for loading into a second operand register;
    moving said operand pointer in said first pointer field to said second pointer field;
    loading into said second operand register a value stored in said register file designated by said operand pointer stored in said second pointer field, wherein said operand in said register file designated by said operand pointer in said first pointer field of said instruction is loaded into said second operand register rather than said first operand register as originally specified by said instruction during execution of said complex instruction.

20. A method in a data processing system for loading an operand into one of a plurality of operand registers according to claim 19 wherein said second pointer field is coupled to an output of a multiplexer, and wherein an input to said multiplexer is coupled to said first pointer field, and wherein said step of moving said operand pointer in said first pointer field to said second pointer field includes moving said operand pointer in said first pointer field to said second pointer field via said multiplexer.

* * * * *

UNITED STATES PATENT AND TRADEMARK OFFICE
CERTIFICATE OF CORRECTION

PATENT NO. : 5,771,366
DATED : June 23, 1998
INVENTOR(S) : Bjorksten et al.

It is certified that error appears in the above-identified patent and that said Letters Patent is hereby corrected as shown below:

Column 1, Line 56: Please change ""Q"" to --"Q'"--.

Column 1, Line 57: Please change ""Q"" to --"Q'"-- and ""b"" to --"b'"--.

Column 1, Line 58: Please change "result "a"" to --result "a'"--.

Column 1, Line 59: Please change ""Q"" to --"Q'"--.

Column 2, Line 42: Please change ""Q"" to --"Q'"--.

Signed and Sealed this

Eighth Day of December, 1998

Attest:

BRUCE LEHMAN

Attesting Officer

Commissioner of Patents and Trademarks